(12) United States Patent
Andrew et al.

(10) Patent No.: US 12,067,070 B2
(45) Date of Patent: Aug. 20, 2024

(54) TRANSFERRING LINK CONTEXT FROM DESKTOP APPLICATION TO BROWSER

(71) Applicant: Microsoft Technology Licensing, LLC, Redmond, WA (US)

(72) Inventors: Felix Andrew, Seattle, WA (US); Laurentiu Nedelcu, Redmond, WA (US); Xiaodong Fan, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/808,878

(22) Filed: Jun. 24, 2022

(65) Prior Publication Data

US 2023/0418891 A1     Dec. 28, 2023

(51) Int. Cl.
| | |
|---|---|
| *G06F 16/955* | (2019.01) |
| *G06F 16/9535* | (2019.01) |
| *G06F 16/954* | (2019.01) |
| *G06F 40/103* | (2020.01) |
| *G06F 40/14* | (2020.01) |
| *G06F 40/169* | (2020.01) |
| *H04L 51/063* | (2022.01) |
| *H04L 51/23* | (2022.01) |

(52) U.S. Cl.
CPC ........ *G06F 16/955* (2019.01); *G06F 16/9535* (2019.01); *G06F 16/954* (2019.01); *G06F 40/103* (2020.01); *G06F 40/14* (2020.01); *G06F 40/169* (2020.01); *H04L 51/063* (2013.01); *H04L 51/23* (2022.05)

(58) Field of Classification Search
CPC .... H04L 51/063; H04L 67/75; G06F 16/9535
See application file for complete search history.

(56) References Cited

U.S. PATENT DOCUMENTS

| | | | |
|---|---|---|---|
| 6,460,038 B1 | 10/2002 | Khan et al. | |
| 8,453,052 B1* | 5/2013 | Newman | G06F 40/194 |
| | | | 715/255 |
| 8,495,485 B2 | 7/2013 | Rundle | |
| 10,339,211 B1* | 7/2019 | Patterson | G06F 40/169 |
| 10,613,713 B2 | 4/2020 | Ozuysal | |

(Continued)

OTHER PUBLICATIONS

"Non Final Office Action Issued in U.S. Appl. No. 17/808,885", dated Sep. 13, 2023, 34 Pages.

(Continued)

*Primary Examiner* — Barbara B Anyan

(57) ABSTRACT

Systems and methods for transferring link context to a web browser. An example method includes receiving, by a web browser, a web address from a desktop application based on a selection of a link in document displayed in the desktop application; receiving, by a web browser from the application, link context for the selected link, the link context including an identification of the desktop application and an identification of the document; loading a web page corresponding to the received web address; based on the link context, identifying a browser-based application corresponding to the desktop application; launching the browser-based application within the web browser; transmitting the link context to the browser-based application; and displaying at least a portion of the document within the web browser.

20 Claims, 15 Drawing Sheets

(56) References Cited

U.S. PATENT DOCUMENTS

| | | | | |
|---|---|---|---|---|
| 2001/0056463 | A1* | 12/2001 | Grady | G06Q 10/10 |
| | | | | 707/E17.112 |
| 2004/0205496 | A1* | 10/2004 | Dutta | G06F 16/957 |
| | | | | 707/E17.119 |
| 2006/0129910 | A1* | 6/2006 | Djabarov | G06F 40/14 |
| | | | | 715/205 |
| 2007/0136430 | A1* | 6/2007 | Qureshi | H04L 51/23 |
| | | | | 709/206 |
| 2007/0143694 | A1 | 6/2007 | Rakowski et al. | |
| 2007/0157119 | A1* | 7/2007 | Bishop | H04L 67/75 |
| | | | | 715/779 |
| 2008/0115048 | A1 | 5/2008 | Veselova et al. | |
| 2008/0115069 | A1 | 5/2008 | Veselova | |
| 2009/0113286 | A1 | 4/2009 | Boegelund et al. | |
| 2009/0177754 | A1* | 7/2009 | Brezina | H04L 67/306 |
| | | | | 709/206 |
| 2010/0017294 | A1* | 1/2010 | Mancarella | H04L 51/063 |
| | | | | 705/14.55 |
| 2012/0066584 | A1 | 3/2012 | Jung et al. | |
| 2012/0084630 | A1 | 4/2012 | Meiskey et al. | |
| 2012/0084644 | A1 | 4/2012 | Robert et al. | |
| 2012/0089901 | A1* | 4/2012 | Collins | H04N 1/4486 |
| | | | | 715/234 |
| 2012/0290945 | A1* | 11/2012 | Byrne | G06Q 10/10 |
| | | | | 715/752 |
| 2013/0047115 | A1 | 2/2013 | Migos et al. | |
| 2013/0067473 | A1 | 3/2013 | Olson et al. | |
| 2014/0344658 | A1 | 11/2014 | Akselrod | |
| 2014/0372865 | A1 | 12/2014 | Corob et al. | |
| 2015/0205767 | A1* | 7/2015 | Stekkelpak | G06F 40/103 |
| | | | | 715/207 |
| 2015/0215370 | A1 | 7/2015 | De La Chevrotiere | |
| 2016/0267060 | A1 | 9/2016 | Skirpa et al. | |
| 2017/0124039 | A1 | 5/2017 | Hailpern | |
| 2018/0052843 | A1 | 2/2018 | Flake et al. | |
| 2018/0239959 | A1* | 8/2018 | Bui | G06F 16/93 |
| 2019/0369824 | A1 | 12/2019 | Robinson | |
| 2022/0365632 | A1 | 11/2022 | Preston | |
| 2023/0418441 | A1 | 12/2023 | Andrew | |

OTHER PUBLICATIONS

"International Search Report and Written Opinion Issued in PCT Application No. PCT/US23/021616", dated Aug. 4, 2023, 12 Pages.

"International Search Report and Written Opinion Issued in PCT Application No. PCT/US23/021855", dated Jul. 27, 2023, 12 Pages.

Final Office Action mailed on Feb. 29, 2024, in U.S. Appl. No. 17/808,885, 18 pages.

* cited by examiner

402 —

Quick Note:

Note Title: [INSERTED BY DEVELOPER/BROWSER ]

URL/Webpage Name: [INSERTED BY DEVELOPER/BROWSER]

Note Content: [INSERTED BY DEVELOPER/BROWSER]

Developer Note Context: [INSERTED BY DEVELOPER]

Note Browser Context 1: [BOOLEAN (Content to be filled by Browser)]

Note Browser Context 2: [BOOLEAN (Content to be filled by Browser)]

Remind Time: [DATE OR TIME]

```
<a ref="quicknote:notetitle=This%20is%20the%20Note%20Title&url=www.microsoft.com&notecontent=This%20is%20the%20Note%20content &notecontext=[NOTECONTEXT]&browsercontext1=true&remindtime=6hrs">Remind Me Later</a>
```

FIG. 4B

TRANSFERRING LINK CONTEXT FROM DESKTOP APPLICATION TO BROWSER

BACKGROUND

Web browsers are computing applications that provide access to the World Wide Web via the Internet. When a user requests a web page from a particular website, such as by sending a request with a Uniform Resource Locator (URL), the web browser retrieves the related content from a web server and displays the web page on the user's device. For instance, when the content is received from the web server, a rendering engine displays the content on a display of a computing device. The web pages may be reached through a series of different options. For example, a user may directly type a URL into a corresponding field of a web browser. In other examples, the user may reach the web page by selecting a link presented in another web page or in a document, such as an email, word-processing document, or other type of document.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The present technology relates to systems and methods that retain and transfer the link context from a desktop application to a web browser to be displayed within the web browser. For example, when a link from a document, such as an email, is selected, context regarding the document is shared with the web browser along with the web address of the link. The link context may include data such as an identification of the application displaying the document (e.g., the email application), an identifier for the document, and a user identifier or profile of the user accessing the document. When the browser receives the web address and the link context, the web browser identifies a browser-based application corresponding to the desktop application that generated the link context. The web browser then launches the identified browser-based application within the web browser, such as in a sidebar pane of the web browser, and provides the link context to the browser-based application, which retrieves the document identified in the link context. The web browser displays the document within the web browser concurrently with the loaded web page. Accordingly, the context from which the web page was accessed (e.g., the document) is provided directly to the user along with the web page within the web browser.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings:

FIG. 4A depicts an example data structure for a quick note protocol.

FIG. 4B depicts an example HTML code for inserting a quick note link into a web page.

DETAILED DESCRIPTION

Figure 1:
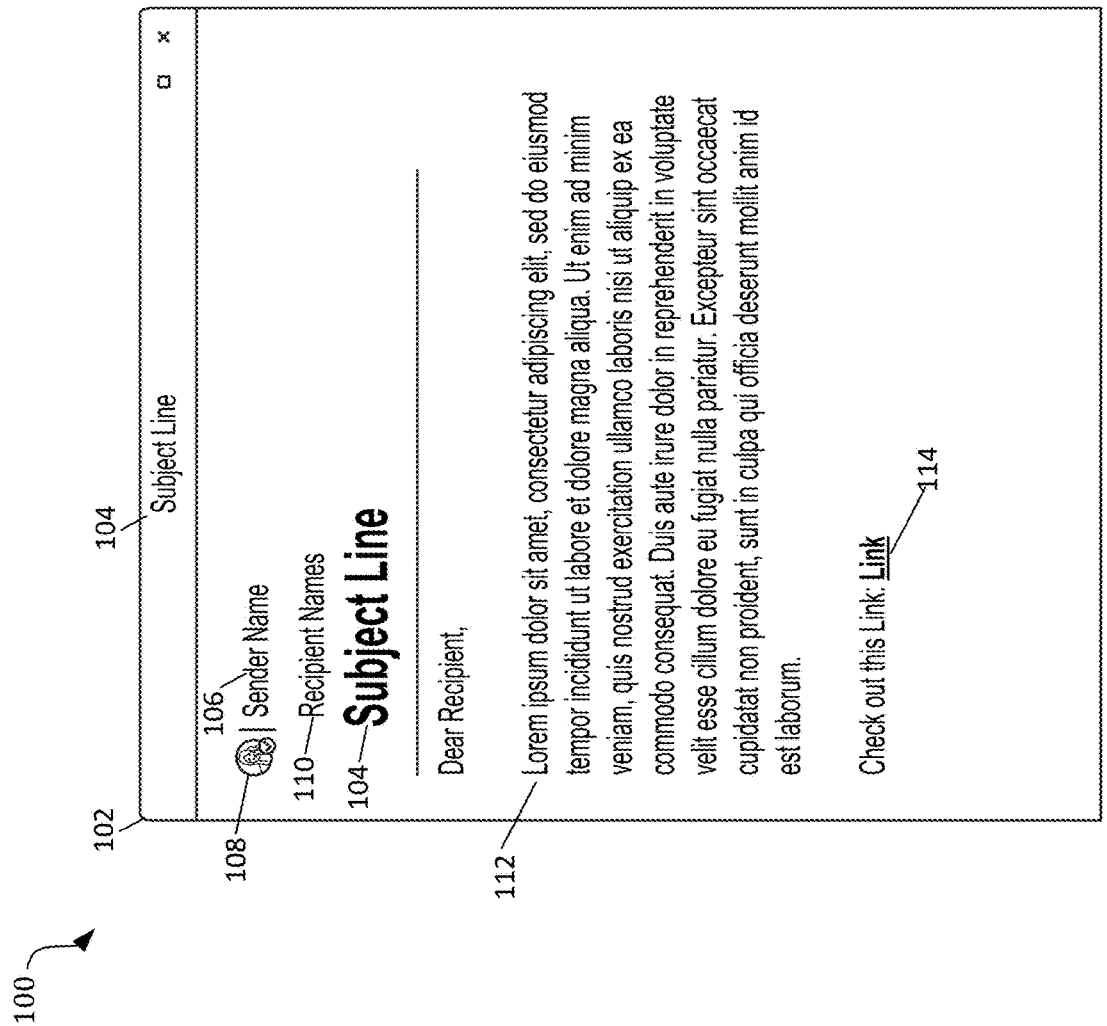
FIG. 1 depicts an example document including a link to a website.

The following detailed description refers to the accompanying drawings. Wherever possible, the same reference numbers are used in the drawing and the following description to refer to the same or similar elements. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the technology, but instead, the proper scope of the technology is defined by the appended claims. Examples may take the form of a hardware implementation, or an entirely software implementation, or an implementation combining software and hardware aspects. The following detailed description is, therefore, not to be taken in a limiting sense.

As briefly discussed above, a web browser retrieves content such as web pages from the World Wide Web and displays that content within the web browser. In some instances, the web page may be accessed from a link in an application other than the web browser. For example, an email may be received and displayed within an email application, which may be a desktop application. The email may include a link to a web page, and when a user selects the link, a web browser is launched and the web page is loaded. If the user wishes to view the email and the web page concurrently, such as to see the context of the email simultaneously with the content of the web browser, the user must rearrange windows or otherwise manipulate the web browser and the desktop email application so that both can be viewed. Such manipulation is cumbersome and frequently results in additional user inputs and graphics processing resources to accomplish the manipulation along with computing resources required to operate both the desktop application and the web browser separately. Viewing both applications separately also results in less efficient use of display or screen real estate, which can be particularly challenging in small-screen devices. In addition, some operating systems prevent multiple applications from being displayed concurrently, which prevents the user from seeing the context of the email concurrently with the web browser.

Among other things, the present technology alleviates the above problems by providing for systems and methods that can retain and transfer the link context to the web browser to be displayed within the web browser. For example, when a link from a document (e.g., the email) is selected, context regarding the document is shared with the web browser along with the web address of the link. The link context may include data such as an identification of the application displaying the document (e.g., the email application), an identification of the document, and a user identifier or profile of the user accessing the document. When the browser receives the web address and the link context, the web browser identifies a browser-based application corresponding to the application that generated the link context. The web browser then launches that browser-based application within the web browser, such as in a sidebar pane of the web browser, and provides the link context to the browser-based application, which retrieves the document identified in the link context. The web browser then displays the document within the web browser concurrently with the loaded web page. Accordingly, the context from which the web page was accessed (e.g., the document) is provided directly to the user along with the web page. Such functionality maximizes screen real estate while also reducing computing resources required for operating a desktop application in addition to the web browser.

The present technology also provides for saving the link context and web page data for later review and retrieval. For example, when some web pages are loaded, the web page generates a notification that is only presented upon a first visit or a first visit within a time frame. Similarly, a first visit to a web page may trigger a flyout from generated from the web browser with additional data. While the notification or flyout may be useful to the user, the user may not be able to interact with the data in the notification at that exact moment, but the notification or flyout may not be generated if the user returns to the web page at a later time.

The present technology provides for the ability to defer interactions or decisions with the data presented in a web page, such as a notification, or data generated by a web browser, such as a flyout. For example, the notification or flyout may include a quick note link or a remind-me link that is configured to include a payload of note properties. When the quick note link is selected by a user, the payload of note properties is delivered to the web browser. The web browser may then launch a browser-based notes application and pass at least a portion of the note properties to the notes application to generate a new note based on the note properties. The generated note is then displayed within the web browser, such as in the sidebar pane of the web browser. The web browser may also include the link context, where available, in the note to preserve the context of the link from which the web page was accessed. The generated note includes a return link that, when selected, causes the web page to load in the state the web page was in when the note was created. If the link context is included in the note, the corresponding document identified in the link context may also be loaded and displayed concurrently with the loaded web page. Such technology allows for recollection of data and context without the need to separately search for or identify such context.

FIG. 1 depicts an example document 100 including a link 114 to a website. The document 100 in the example depicted is an email. In other examples, the document 100 may be an electronic file, created by a user or received by a user, that includes the link 114, such as a word-processing document, spreadsheet document, spreadsheet document, notes document, etc. In yet other examples, the document 100 may be a web-based document, such as web page or other type of HyperText Markup Language (HTML)-based documents traditionally accessed by a web browser.

The email 100 is displayed in an application window 102. In other examples, the email 100 may be displayed within a pane of an email application, within a mobile-based application, or another possible view of the content of the email 100. The email 100 may be displayed on a desktop computer via a desktop email application or through a web browser or browser-based email application. The email 100 includes a subject 104 which may be displayed within a header or title of the window 102 and in the content of the email 100 itself. The email also includes additional information, such as the sender's name 106 and the recipient name(s) 110. Additional data 108 regarding the sender may also be retrieved by email application that is displaying the email 100, and the additional data 108 about the sender may be displayed within the email 100. For example, the additional data 108 may include an image of the user and a status indicator for the user, among other types of data.

The email may also include a body 112 with text, images, or other content within the body 112. The body 112 may also include the link 114 to the website. When a selection of the link is received, the operating system launches a web browser and the web address (e.g., URL) of the link 114 is passed to the web browser. The web browser then loads the web page or resource corresponding to the web address and displays the web page or resource.

With the present technology, link context may also be passed or sent to the web browser that indicates the context from where the web page was accessed. For instance, such link context data may indicate the document from which the link was selected. In the present example, the link context data may indicate that selection of the link originated from the email 100. For instance, the link context data may include a unique identifier (e.g., a globally unique identifier (GUID)) for the document from which the link was selected along with an identification of the application from which the link was selected. The context data may also include an identification of the user (e.g., a user name) and/or user credentials for the user that accessed the respective document (e.g., email 100). Additional application-specific data may also be passed from the document application to the browser. For instance, the application may pass additional data that may be required by the web-based version of the application to retrieve the document 100. An example of web browser displaying the web page accessed from selecting the link 114 is shown in FIG. 2A and discussed below.

Figure 2A:
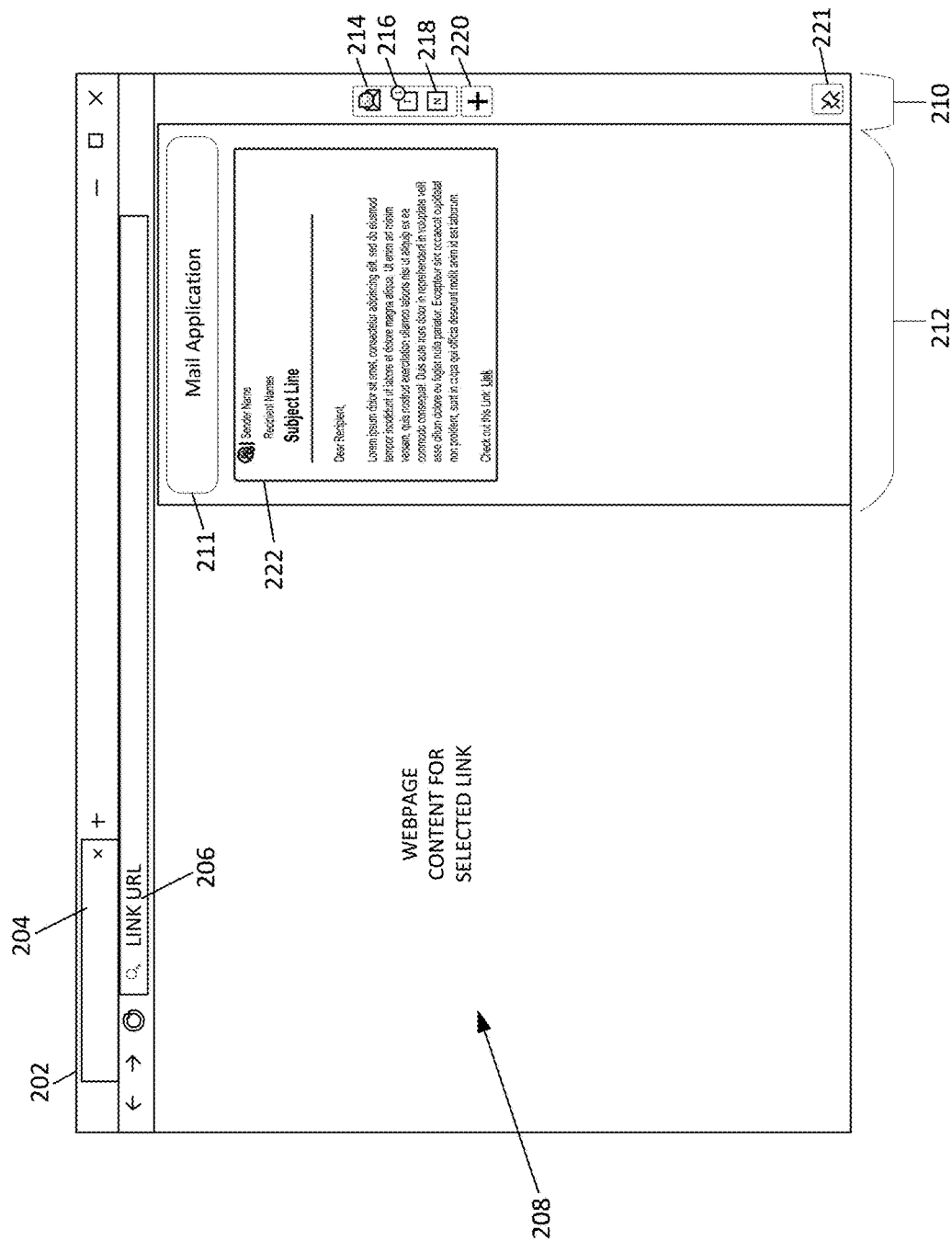
FIG. 2A depicts an example web browser displaying a web page and example link context for the web page.

FIG. 2A depicts an example web browser 202 displaying a web page and example link context for the web page. The web browser 202 includes several standard features of web browsers, such as a tab indicator 204 that indicates a particular web page that is being displayed. The web browser 202 also includes a search or URL bar 206 that includes the current URL of the web page that is being displayed by the web browser 202. Other user interface elements, such as a back, forward, and reload button are also presented by the web browser 202. The web browser 202 displays the web page in a main browsing frame or primary display area 208.

The example web browser 202 also includes a sidebar 210 and a sidebar pane 212 that extends outward from the sidebar 210. While the sidebar 210 and the sidebar pane 212 are depicted as being on the right-hand side of the web browser 202, the sidebar 210 and/or the sidebar pane 212 may be positioned at different locations within the interface of the web browser 202. For example, the sidebar 210 and/or the sidebar pane 212 may be positioned on the left-hand side, the top, or the bottom of the web browser 202.

The sidebar 210 may include selectable icons corresponding to browser-based applications. The browser-based applications may correspond to other types of applications that are traditionally associated as being desktop applications, such as an email or mail application (e.g., the OUTLOOK mail application from the Microsoft Corporation of Redmond, Washington, the GMAIL mail application from Google of Mountain View, California), a collaboration application (e.g., the TEAMS collaboration application from the Microsoft Corporation), a notes application (e.g., the ONENOTE notes application from the Microsoft Corporation), a spreadsheet application, a presentation application, among others. For instance, a desktop application exists and executes outside of and independently from the web browser, whereas the browser-based application operates within the web browser. As a result, the screen real estate and processing consumption required for operating the desktop application in addition to the web browser differs from the resources required to operate the corresponding browser-based application within the web browser.

In the example depicted, the sidebar includes a mail application icon 214, a collaboration application icon 216, and a notes application. An add-app icon 220 may also be included to add additional web-based applications into the web browser 202. When an application icon is selected, the sidebar pane 212 is populated with data from the corresponding browser-based application. The sidebar pane 212 may also include a docking icon 221. Selection of the docking icon 221 toggles docking of the sidebar pane 212. When the sidebar pane 212 is docked, the sidebar pane may not overlap the primary display area 208 (e.g., the primary display area 208 shrinks horizontally such that the sidebar pane 212 and the primary display area 208 are displayed concurrently). When the sidebar pane 212 is undocked, the sidebar pane 212 overlaps or occludes a portion of the primary display area 208. In some examples, when the sidebar pane 212 is undocked, the sidebar pane 212 may be minimized when the cursor is moved away from the sidebar pane 212.

As discussed above, when the link 114 is selected from the email 100, the web browser 202 is launched or, if already opened, the web browser 202 is changed to be the active window. The web browser 202 then navigates to the URL of the link 114 and displays the web page or web resource of the URL in the primary display area 208. The web browser 202 may open a new tab to display the web page or resource. The link context that is received from the application from which the link was selected is used to populate the sidebar pane 212. For instance, when a link is selected and the corresponding URL is loaded, the sidebar pane 212 is populated with the source of the link.

Continuing with the present example of email 100 with link 114, the link context received by the example web browser 202 indicates the type or name of application used to open the email 100, an identifier for the email 100, and a user profile for the user that was accessing the email. Based on that link context, the example web browser 202 determines if a corresponding browser-based application (a mail browser-based application in this example) is installed in or accessible via the example web browser 202. If the corresponding browser-based application is not installed or accessible via the browser 202, the browser-based application is launched or loaded in the sidebar pane 212. In the present email example, the browser-based application 211 is loaded in the sidebar pane 212. The browser-based mail application 211 then uses the identifier of the email 100 and the user profile data in the link context to access or retrieve the email 100. The browser-based mail application 211 then provides the email 100 to the example web browser 202 for display in the sidebar pane 212.

The email 100 is shown as browser-based email 222. The browser-based email 222 may differ in display from the email 100 depicted in FIG. 1 due to the differences between the desktop mail application and the browser-based mail application. For instance, only a portion of the email 100 may be presented or displayed in the browser-based email 222. As an example, the sender of the email 100 and the subject may be displayed. In other examples, the body or at least a portion of the body of the email 100 may be displayed. Any combination of the different components of the email 100 discussed above may be displayed within the sidebar pane 212. In some examples, the browser-based mail application 211 selects the components of the email 100 that are to be displayed as the browser-based email 222.

By having the browser-based email 222 displayed in the sidebar pane 212 concurrently with the display of the web page content in the primary display area 208, the user is provided with the context from where the web page was initially accessed (e.g., the email). As such, additional information or context about the web browsing experience is provided directly in the browser. Such context may lead to greater user efficiencies, improved user-computer interaction, and conserve computing resources that would otherwise be required by the user switching between windows or tabs of applications attempting to find the context from where the link originated. By providing the context directly in the web browser 202, such navigation is no longer necessary.

While the example above is primarily related to an email being the source of the link, other documents or communications may be the source of the link and may be processed similarly by the web browser 202. For example, the source document may be a word-processing document that is being presented by a word processing document. Upon selection of the link from the word-processing document, the word-processing application provides link context to the web browser 202. The link context includes the name or type of word-processing application, an identifier for the document, and a user profile for the user accessing the document. The web browser 202 then identifies the corresponding browser-based word-processing application and ultimately displays at least a portion of the word-processing document in the sidebar pane 212. Similarly, the source of the link may be a communication, such as message (e.g., text message, short message service (SMS) message, message in a collaboration application, or a post in a social media application). In such examples, the application displaying the message with the link generates link context that identifies the application, an identification of the communication containing the link, and/or an identification of the user. The web browser 202 then identifies the corresponding browser-based application and displays the communication within the sidebar pane 212.

The link context for the web page or browsing session may also be saved and shared in some examples. For instance, if the web page is bookmarked or otherwise saved by the browser, the web browser may save the link context associated with the web page and the current browsing session. Further, if a link to the web page or resource is shared, the link may also include the link context of the current browsing session. As an example, if a share or copy-and-paste operation of the link is received during the current browsing session showing the link context, the shared or copied link may also incorporate the link context. Incorporating the link context into a shared link package may be performed by the web browser. For instance, upon receiving the share or copy selection, the web browser may generate a link package that includes the link to the web page along with the link context. That link package may then be pasted or shared.

Figure 2B:
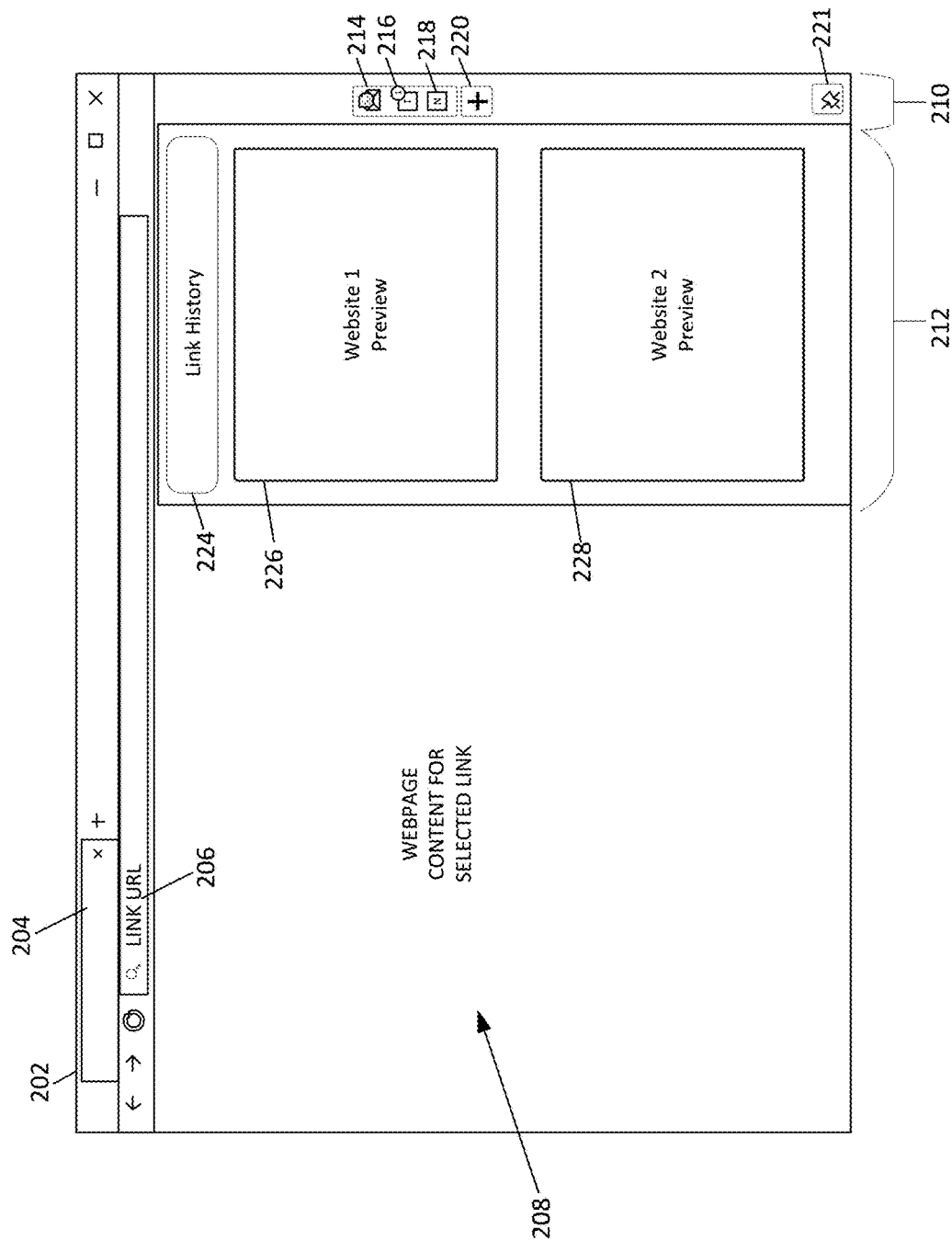
FIG. 2B depicts an example web browser displaying a web page and example link context for the web page.

FIG. 2B depicts an example web browser 202 displaying a web page and example link context for the web page. While FIG. 2A primarily considers the source document to be a document that is accessed by an application other than the web browser 202, the source document may in other examples be a web resource or page that is accessed by the web browser 202. In such examples, the link context may be generated from the web browser 202 itself. For instance, as a user traverses from one web page to the next, the link context may be augmented by tracking the source web page for each link selection.

In the example depicted in FIG. 2B, a link history application 224 is loaded in the sidebar pane 212. In some examples, the link history application 224 may be a part of the browser functionality, such as a utility. In other examples, the link history application 224 may utilize resources outside of the web browser 202. The link history application 224 populates the sidebar pane 212 with the link sources, which may be organized in chronological order. For instance, link for the web page currently displayed in the primary display area 208 may have been accessed from Website 1, which is shown in the Website 1 preview 226 in the sidebar pane 212. In turn, Website 1 may have been accessed from Website 2, which is shown in the Website 2 preview 228 in the sidebar pane 212. The Website 1 preview 226 and the Website 2 preview 228 may each display a thumbnail or image of the content of the corresponding Website 1 and/or Website 2. The thumbnail or image of the content of Website 1 and/or Website 2 may be captured by the web browser upon selection of the link(s) within the websites.

Similar to the discussion above with respect to FIG. 2A, by having the context of the link sources displayed concurrently with the web page in primary display area 208, efficiency gains are achieved. For example, instead of having to switch between tabs or windows, the context and/or sources of the respective web pages can be readily seen during a browser session.

The link context as well as the web page state or context may also be saved and used for later retrieval of the web page in the same state as when the context was saved. For example, after the web page is loaded in the primary display area 208 and the link context is used to populate the sidebar pane 212, the state of the web page and the link context may be saved for later retrieval, as discussed in the examples below. By saving the web page state and the link context, the user is able to return to the same state at a later date or time, which may occur due to conflicting needs at any given time.

Figure 3A:
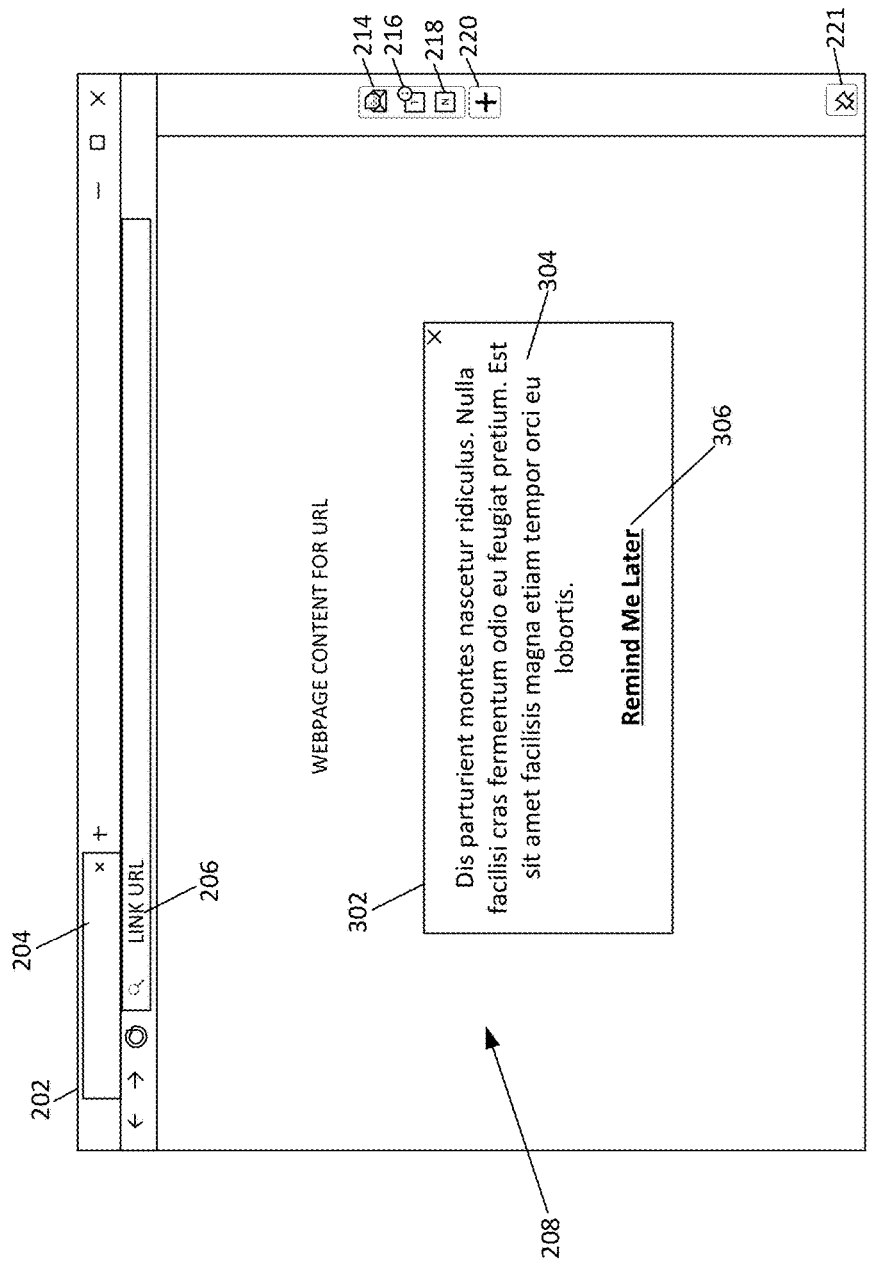
FIG. 3A depicts an example web browser displaying web page content and a notification from the web page.

FIG. 3A depicts an example web browser 202 displaying web page content and a notification 302 from the web page. In the example in FIG. 3A, the web browser 202 has navigated to a web page via a link, similar to the examples discussed above. Link context has been provided to the web browser 202, and the sidebar pane 212 has been minimized. When accessing the web page, the web page causes the notification 302 to be displayed. The notification 302 includes a notification message 304 and a "Remind Me Later" link 306.

In some cases, when a web page is first accessed (or first accessed within a certain time period), the web page may generate a notification 302 for display to the user. The notification 302 may be provided in the body of the web page or in another form, such as a popup shown in FIG. 3A. If user navigates away from the web page and then later returns, the web page may not display that same notification 302 because the web page may not want to create interferences or annoyances for the user. However, the result of the selective notifications is that a user may only have one opportunity to interact with or take note of the content of the notification 302. For instance, in some cases the notification 302 may regard a password or credential change being required relatively soon or other security concerns that need be addressed by the user at some point in time. In another examples, discount codes may be provided in the notification 302 upon a first visit to the web page but not on subsequent visits to the web page. In any case, the user may need to immediately interact with the notification 302, or otherwise use the data in the notification 302, or risk losing that information.

The present technology introduces a process for saving the state of the web page, along with the link context, through selection of a Remind Me Later link within the notification 302 or the web page. The process or protocol that enables such state saving may be referred to as the remind-me-later protocol or the quick note protocol. The quick note protocol has some similarities to the "mailto" protocol for generating emails. The quick note protocol, however, does not generate emails. Rather, the quick note protocol generates a note that includes the saved state of the web page and/or the link context regarding the source of the link from which the web page was accessed. For example, when the "Remind Me Later" link 306 is selected, a note is generated that preserves the state of the web page and the link context. The note may then be retrieved at a later time, and the web page can be accessed from a return link within the note. Additional details regarding the quick note protocol are discussed further below with reference to FIGS. 4A-4B. A remind-me-later or quick note link 306 may be configured and incorporated in the web page and/or notification 302 by a web developer. In other examples, the quick note link may be injected into a webpage or notification 302 by the web browser 202 itself.

Figure 3B:
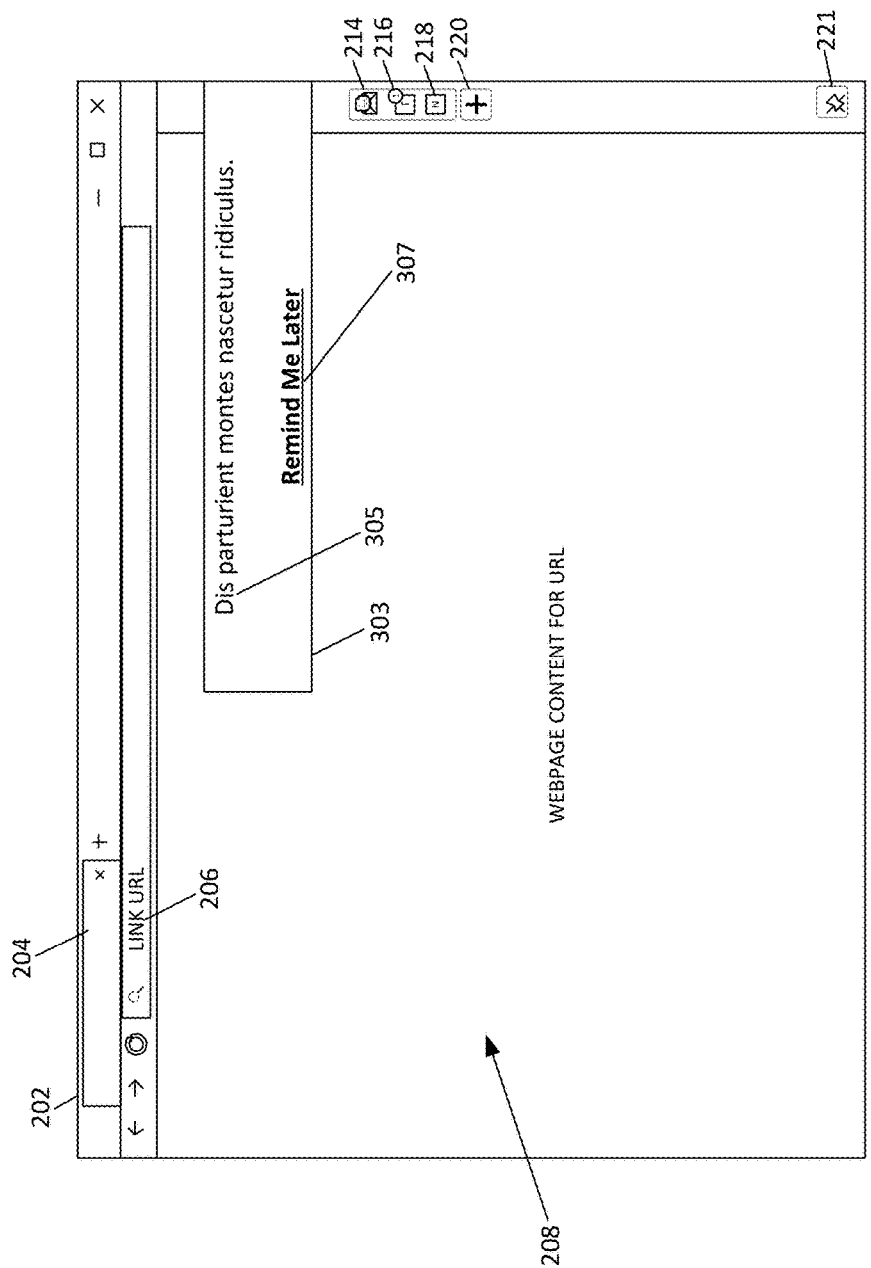
FIG. 3B depicts an example web browser displaying web page content and a flyout generated by the web browser.

FIG. 3B depicts an example web browser 202 displaying web page content and a flyout 303 generated by the web browser 202. The flyout 303 may also be a form of a notification. In addition, while shown as a flyout 303, the content of the flyout may be populated into the sidebar pane 212 in some examples.

The flyout 303 includes a flyout message 305 and a "Remind Me Later" link 307. The flyout 303 may be generated based on the content of the web page that is loaded in the primary display area 208. For example, the web browser 202 may scan or analyze the content of the web page and, based on that content, generate the flyout 303. Similar to the notification 302 discussed above, the flyout 303 may not be generated upon every visit to the web page. Accordingly, the user may have the same urgency to interact with the flyout 303 as it may not be generated upon another visit to the web page. The user may then select the "Remind Me Later" link 307 to generate a note that preserves the state of the web page and the link context to be retrieved at a later time. Thus, the user is able to defer the interaction with the flyout 303 or the use of the information contained in the flyout message 305.

FIG. 4A depicts an example data structure 402 for use with the remindme or quick note protocol. The quick note data structure is defined by a plurality of properties that may be used for generating the note upon selection of a quick note link. For example, the properties may include a Note Title property, a URL/Webpage Name property, a Note Content property, a Developer Note Context property, a First Note Browser Context property, a second Note Browser Context property, and/or a Remind Time property. Additional or fewer properties may also be associated with the quick note link. The properties of the quick note link may be provided in the HTML code itself or in a JavaScript Object Notation (JSON) payload, among other options. When the quick note link is selected, the web browser detects the remindme or quick note protocol and uses a registered protocol handler to process the data within the quick note link. For example, the web browser may open the associated browser-based application and pass the quick note properties (e.g., the JSON payload) to the browser-based application to generate the note or reminder.

The Note Title property defines a title for the note that is to be created. The Note Title property may be filled by the web page developer when creating the web page. In other examples, the web browser may fill the Note Title property, when the quick note link is selected, based on additional data surrounding the quick note link, a website name, or other data about the browsing experience. The URL/Webpage Name property includes the webpage on which the quick note link is included (e.g., the web page that is to be viewed with the with quick note link). The URL/Webpage Name property may be filled by the webpage developer when creating the web page, or the URL/Webpage Name property may be filled by the web browser when the quick note link is selected. For instance, the web browser may fill the property with the URL of the webpage that is displayed within the primary display area when the quick note link is selected.

The Note Content property defines the content of the note, such as the content that is to be included in the body of the note when the note is created. The Note Content property may be filled by the web page developer when creating the web page. For example, the web developer may have a portion of the notification or the web page, or a different message altogether, that should be incorporated into the note to preserve what the developer considers to be the important message for the user to save for a later time. Additionally or alternatively, the web browser may fill the Note Content property based on text surrounding the quick note link. For instance, for a notification or flyout, the message of the notification or flyout may be populated into the Note Content property by identifying particular entities in the text surround the quick note link. As an example, upon receiving a selection of the quick note link, the web browser may execute an entity recognition algorithm to extract one or more entities that are incorporated into the Note Content property.

The Developer Note Context property may be filled by the web page developer with additional context or data that the developer may need or use to recreate the state of the webpage as it appears to the user when the quick note link is selected. The data for the Developer Note Context property may be specific to the web developer and/or the website on which the web page is hosted. For instance, specific types of data may be needed for each web page to restore to a specific state, such as a state that causes the generation of the notification and/or the flyout.

The First Note Browser Context property and the Second Note Browser Context property are properties that can be selected by the developer to activate a web browser function that provides the corresponding context. For example, the First Note Browser Context property may be the link context discussed above that is received by the web browser when a link is selected. The Second Note Browser Context property may be additional context about the browsing experience, such as a user profile of the user signed into the browser, browsing history, cookies, cached data, other context data about the browsing experience. Note Browser Context properties may also include a screenshot or image of the webpage at the time the quick note link was selected, which may be captured or generated by the web browser. Additional Note Browser Context properties other than the First and Second Note Browser Context properties may also be included as quick note properties.

To use the respective Note Browser Context properties, the web developer fills the corresponding field to a Boolean value such as 1 or true. When the web browser receives a selection of the quick note link with a Note Browser Context property having a true value, the web browser then incorporates the corresponding Note Browser Context into the note that is generated. As an example, where the First Note Browser Context is for the link context discussed above, the web browser incorporates the link context into the generated note.

The Remind Time property defines a time at which a reminder may be generated. The Remind Time property may be filled by the web developer or the web browser. For example, the web developer may include a specific date and time at which the reminder should be generated or a timer duration (e.g., 8 hours, 1 day) that, upon expiration of the timer, the reminder should be generated. In other examples, the Remind Time property may be filled by the web browser to a default time or a time based on the text surrounding the quick note link. For instance, the text surrounding the quick note link may indicate that a user's password is expiring on a specific date. The web browser may analyze that text to identify an expiration date entity and use the identified expiration date to fill the Remind Time property. The reminder that is ultimately generated based on the Remind Time property may be generated through the sidebar or sidebar pane of the web browser. For instance, a reminder or notification may be displayed within web browser, such as in the sidebar or sidebar pane. The notification may also include audio or haptic outputs in some examples. In other examples, the web browser may communicate with a scheduling or calendaring application to create a reminder or appointment on the calendar corresponding to the Remind Time property. The Remind Time property may also be event based rather than a time or date based property. For instance, the Remind Time property may include an event that triggers the reminder to be issued, such as the next time the user navigates to the web page or a specific web page.

FIG. 4B depicts an example HTML code 404 for inserting a quick note link into a web page. The HTML code 404 is an example of what a web developer may insert into a webpage to cause the creation of the quick note link. When the quick note link is selected, the web browser receives the quick note properties within the HTML code 404 and processes the quick note properties to generate a new note according to the quick note protocol. For the example HTML code 404 depicted in FIG. 4B, a selectable quick note link is displayed in the web page having the text (e.g., anchor text) of "Remind Me Later." When the quick note link is selected, the web browser causes a new note to be generated that has a title of "This is the Note Title", a URL of www.microsoft.com, note content of "This is the Note Content," and a reminder will be generated in six hours.

The note that is generated, upon receiving a selection of the quick note link, may be generated within a feature of the web browser itself and/or within a browser-based notes application. For instance, the web browser may pass the properties of the quick note link to the to the browser-based notes application, which creates the note. In some examples where there is no browser-based notes application, the web browser may pass the quick note properties to a desktop notes application that creates the corresponding note outside of the browser.

Figure 5:
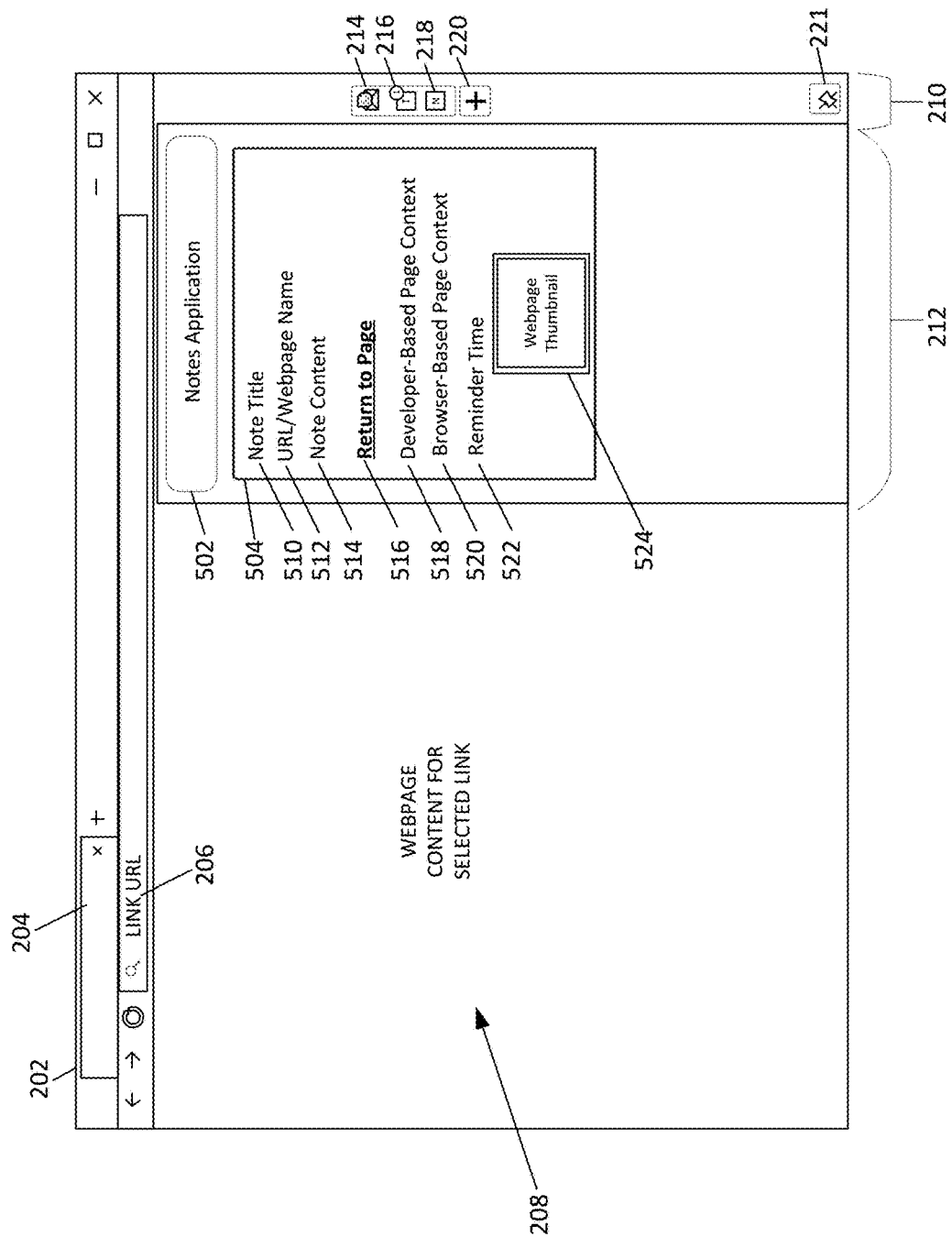
FIG. 5 depicts an example web browser displaying a web page and an example quick note.

FIG. 5 depicts an example web browser 202 displaying a web page and an example quick note 504. When a quick note link is selected, the example web browser 202 causes the note 504 to be created according to the quick note properties in the quick note link. In the example depicted, when the quick note link is selected and the example web browser 202 receives the quick note properties, the example web browser 202 causes a browser-based notes application 502 to load in the sidebar pane 212. The new note 504 is also created and displayed within the sidebar pane 212. The example note 504 includes a note title 510, a URL or webpage name 512, note content 514, and a selectable return link 516. A selection of the selectable return link causes the web browser to the load the web page from which the note was generated in the web page state at the time the note was generated or the quick note link was selected.

The note 504 may also include developer-based page context 518, browser-based page context 520, a reminder time 522, and a web page thumbnail 524. The developer-based page context 518 and the browser-based page context 520 may not be visible within the displayed portion of the note 504. For instance, the developer-based page context 518 and/or the browser-based page context 520 may be stored as metadata with the note 504. The reminder time 522 may be displayed within the note 504 or the reminder time 522 may not be displayed within the note 504. When displayed, the reminder time may indicate the time at which the reminder will be provided. In other examples, the reminder time 522 may be stored as metadata with note 504 and may not be displayed. The web page thumbnail 524 is an image of the web page as it existed when the note was created (e.g., when the quick note link was selected). The web page thumbnail 524 may be generated by the web browser 202 upon receiving a selection of the quick note link, and the generated image or thumbnail is passed to the browser-based notes application 502 that generates the note 504.

One or more of the fields in the note 504 may be editable by the user from within the browser-based notes application 502 in the sidebar pane 212. For example, the note title, note content, and the reminder time may all be editable by the user. Accordingly, the user is able to provide additional or different notes and content that may be relevant to the specific user and what that user would like to see when the reminder time is reached. The reminder time may also be adjusted to allow for the user to set the time that the reminder should be issued.

While the fields of the note are editable through the sidebar pane 212 in the example depicted, in some examples, the fields may additionally or alternatively be editable during the note creation process. For example, when the note 504 is being created in response to selection of the quick note link, a user interface may be presented to the user to change or augment the data to be included within the note. The user interface may be included in the sidebar pane 212, within a popup window, or within another portion of the web browser 202.

Figure 6:
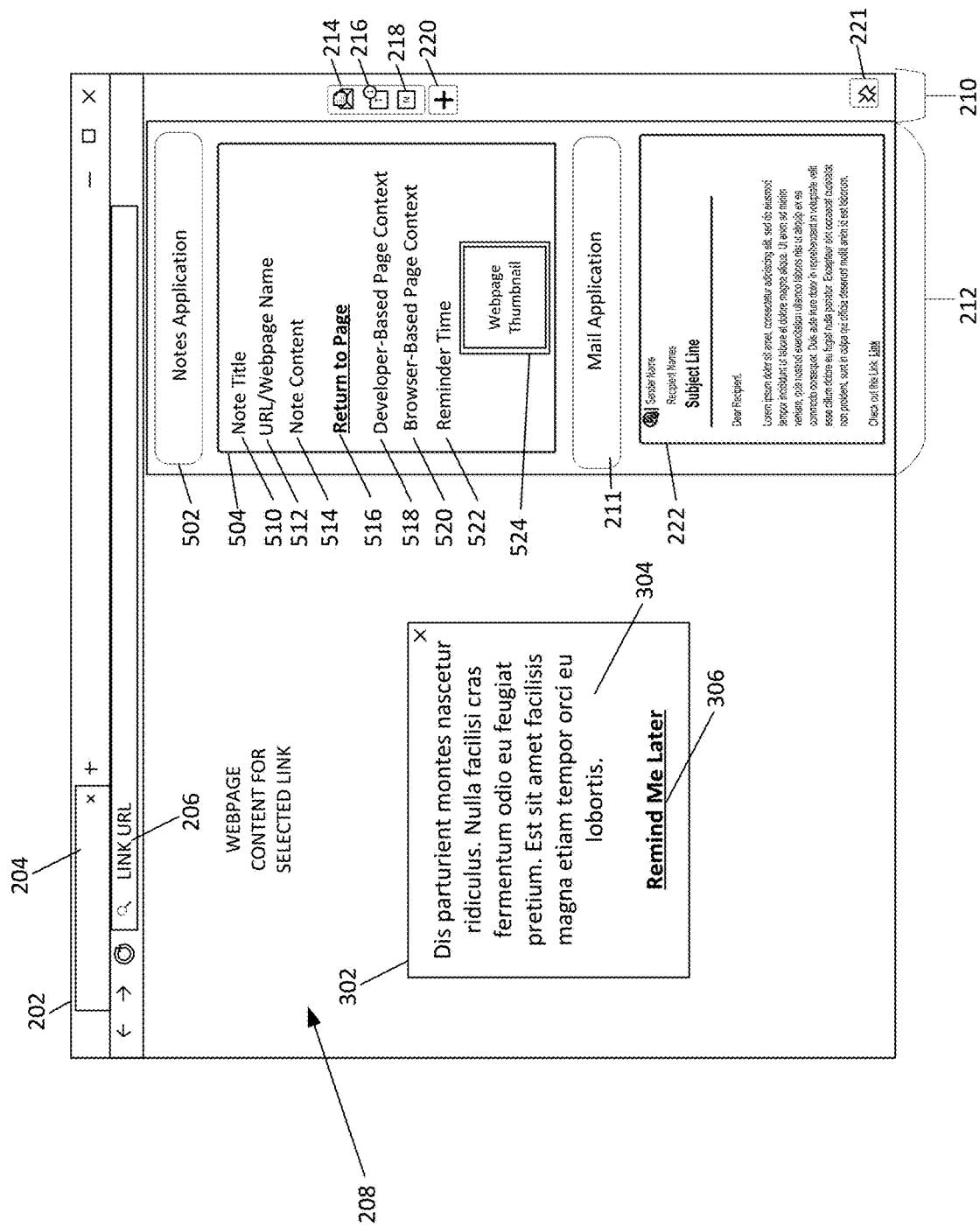
FIG. 6 depicts an example web browser displaying a web page retrieved from an example note.

FIG. 6 depicts an example web browser 202 displaying a web page retrieved from the example note 504. For example, upon selection of the return link 516, the corresponding web page is loaded in its prior state (e.g., the state when the note 504 was created). To load the web page, the web browser 202 receives the web address for the web page as well as any developer-based page context 518 that is stored with the note 504. This allows the website to provide the web page in its previous state. For instance, loading the web page in its previous state may include also loading the notification 302 and/or causing the flyout 303 to be generated.

The link context, where it is part of the note 504, may also be reloaded. For example, the link context is provided back to the web browser 202, where the web browser 202 causes the corresponding application and document(s) or communication(s) to load, similar to how the link context was implemented by the web browser 202 as discussed above. In the example depicted, the link context is the same as the link context discussed above with reference to FIGS. 1 and 2A. Accordingly, the web browser 202 causes the browser-based mail application 211 to load in the sidebar pane 212 and the corresponding browser-based email 222 is displayed in the sidebar pane 212. In the example depicted, the example quick note 504 and the browser-based email 222 (e.g., the link context) are displayed concurrently within the sidebar pane 212. The user may be able to reconfigure this display, such as by closing the browser-based notes application 502 such that only the link context (e.g., the browser-based email 222) is shown in the sidebar pane 212.

Figure 7:
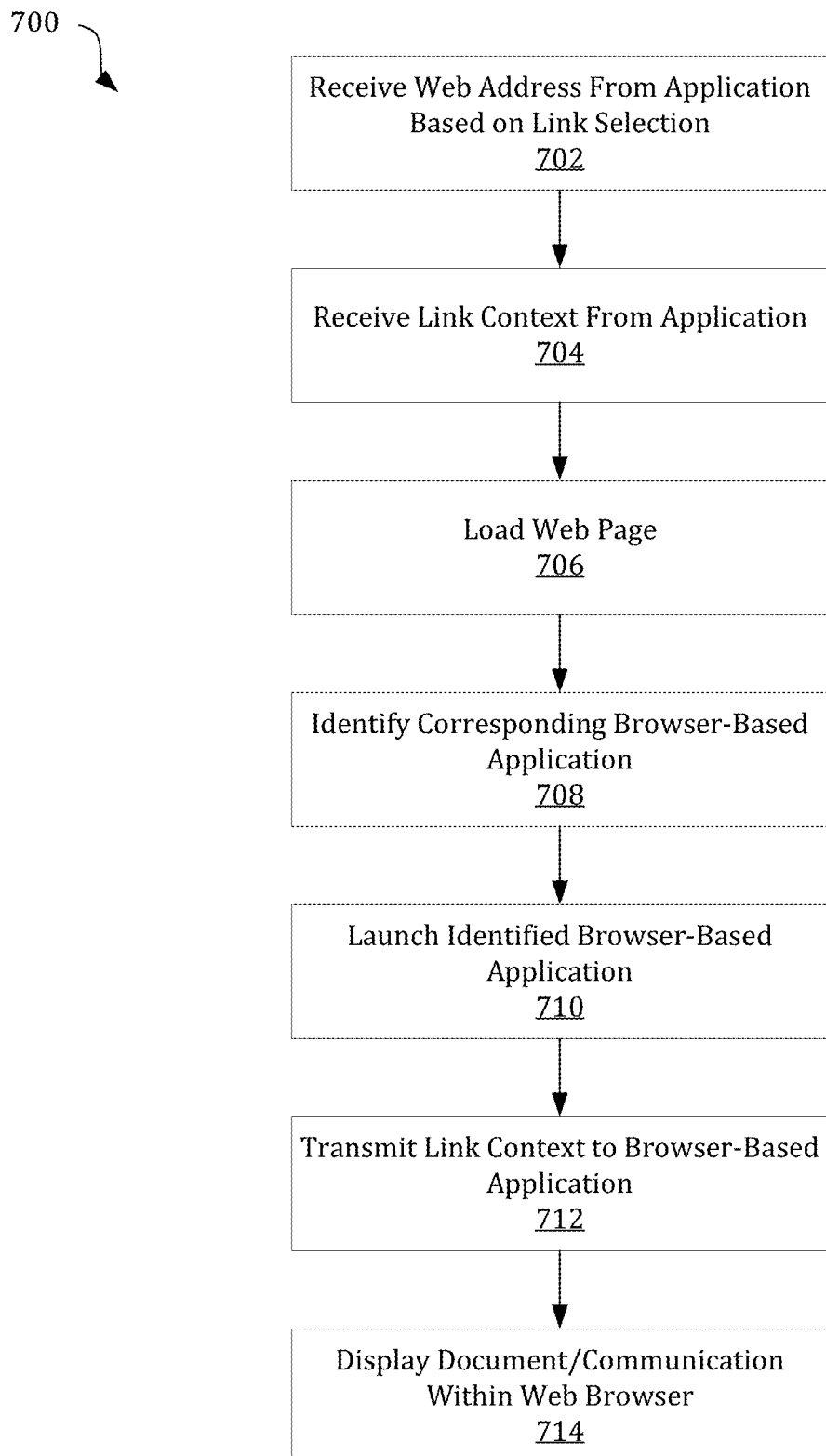
FIG. 7 depicts an example method for generating and displaying link context for a web resource accessed from a link.

FIG. 7 depicts an example method 700 for generating and displaying link context for a web resource accessed from a link. The method 700 may be performed by a web browser operating on a client device. At operation 702, a web address (e.g., a URL) is received from an application based on a selection of a link within a document or communication open by the application. The application may be a desktop application, such as a mail application, a word-processing application, a messaging application, or the like. At operation 704, link context is received from the application. The link context may include identifier for the document or communication from which the link was selected (e.g., a unique document or communication identifier), an identification of the application (e.g., the name of the application), and/or an identification of the user (e.g., a user name and/or user credentials) that accessed the document or communication and selected the link.

At operation 706, the web browser loads the web page corresponding to the web address received in operation 702. The web page may be loaded in a primary display area of the web browser. At operation 708, the web browser identifies a browser-based application that corresponds to the identifier of the application in the link context received in operation 704. For example, the web browser may query installed or accessible browser-based applications to determine if there is a browser-based application that corresponds to the application that provided the link context. If there is an installed or accessible corresponding browser-based application, the web browser causes that browser-based application to be launched within the web browser at operation 710. If the corresponding browser-based application is not installed or accessible but there the corresponding browser-based application is available for installation or accessibility, the web browser may display a prompt to install the corresponding browser-based application. Once the browser-based application is installed or made accessible, it is launched at operation 710. In some examples, the browser-based application is launched or otherwise displayed in a sidebar pane of the web browser.

At operation 712, at least a portion of the link context is transmitted from the web browser to the browser-based application that is launched in operation 710. For instance, the document identifier and the user profile information may be transmitted to the browser-based application such that the browser-based application is able to retrieve the document or communication. The browser-based application then retrieves the document or communication based on link context provided by the web browser. The document or communication is returned to the web browser for display. Accordingly, at operation 714, the web browser displays at least a portion of the document or communication returned from the browser-based application. The web browser may display the document or communication concurrently with the web page loaded in operation 706. For instance, the document or communication may be displayed in a side pane of the web browser while the web page is displayed in the primary display area of the web browser. Operations 706-714 may occur without any further input from the user. For instance, the link selection from the user may trigger operations 706-714 to be performed by the web browser without any further inputs received from the user.

Figure 8:
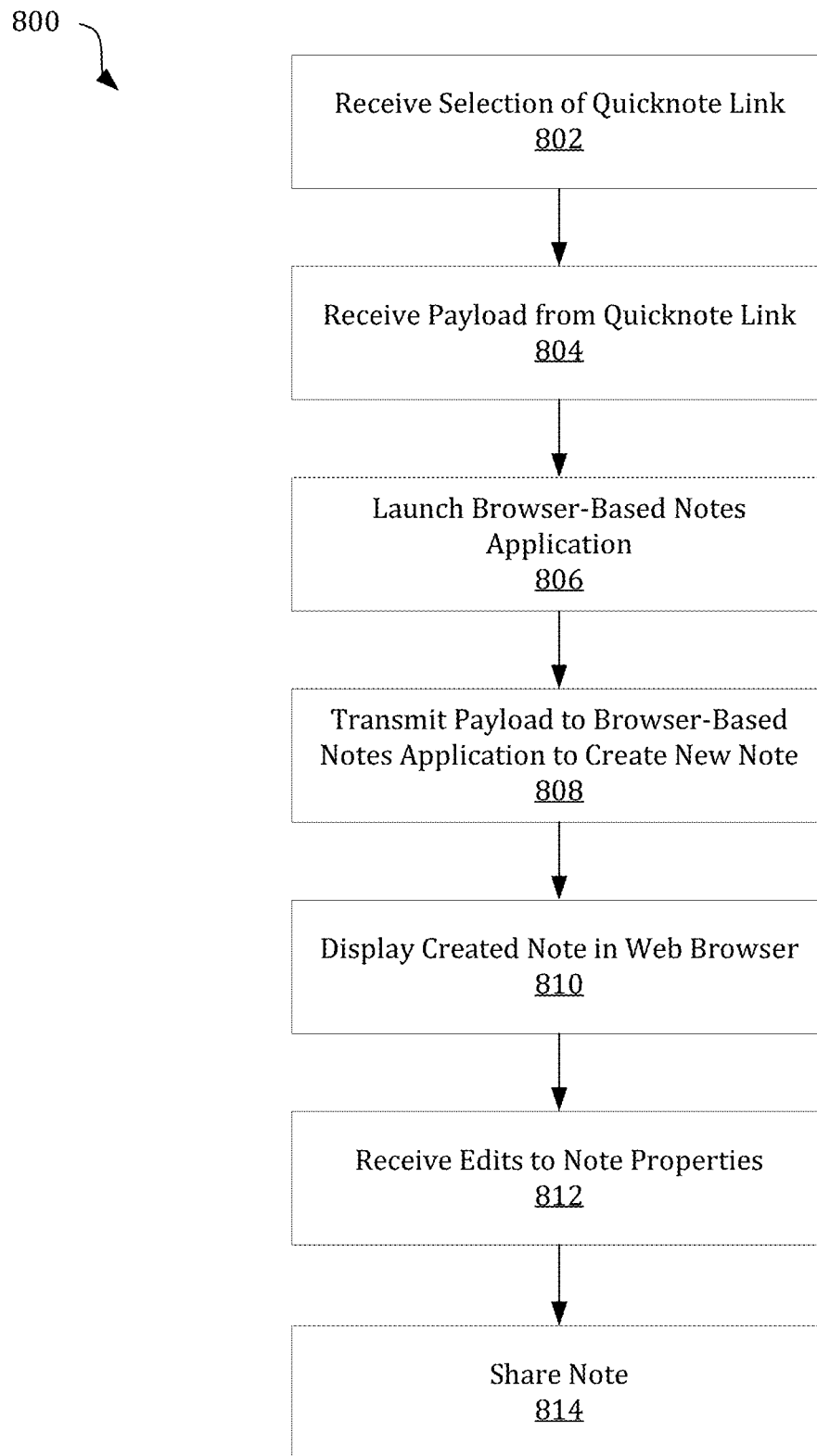
FIG. 8 depicts an example method for generating a note.

FIG. 8 depicts an example method 800 for generating a note. The method 800 may be performed by a web browser. At operation 802, a selection of a quick note or remindme link is received. For instance, the quick note link may be displayed within a web page, notification, flyout, or similar user interface of the web browser. The selection may be received as any type of user input, such as touch, click, verbal input, gesture, or other types of input. Based on the selection of the quick note link, a payload from the link is received by the web browser at operation 804. The payload from the link may be received as HTML properties, JSON data, or other possible formats. The payload of the link includes note properties for generating the note based on selection of the link. The note properties may include any of the properties discussed herein.

At operation 806, based on receiving selection of the quick note link, the web browser launches a browser-based notes application. For instance, the browser-based notes application may be launched in a sidebar pane of the web browser while the web page is concurrently displayed within the primary display area. At operation 808, the web browser transmits at least a portion of the payload received in operation 804 to the browser-based notes application so that the browser-based notes application can create a new note based on the payload. For example, one or more of the note properties in the payload may be transmitted to the browser-based notes application.

Depending on the properties in the payload, the web browser may also add additional data to the note properties. For example, where the note properties include one or more selected note browser contexts, the web browser incorporates the corresponding contexts. For instance, the web browser may incorporate the link context for the web page into the note properties. The web browser may also execute entity recognition models against the web page, notification, or other data to generate data to incorporate into the note properties. Such additional data is also transmitted to the browser-based notes application to create the new note.

The note generated by the browser-based notes application is then displayed in the web browser at operation 810. For example, the note may be displayed in a sidebar pane of the web browser while the web page is displayed within the primary display area.

The displayed note may include one or more of the note properties that the web browser transmitted to the browser-based notes application. At least one of those note properties may be editable by a user. In such examples, at operation 812, edits to one or more of the note properties may be received by the web browser and passed to the browser-based notes application that adjusts the note properties based on the received edits. The created note is then saved for later access.

At operation 814, the created note may be shared with other users. For instance, the web browser and/or browser-based notes application may provide a selectable user interface element to share the note with another user. The selectable user interface element may be provided within the note and/or within the browser-based notes application interface in the sidebar pane of the web browser. When an indication to share the note is received (e.g., a selection of the user interface element), the note is transmitted to the specified users. Accordingly, other users may be able to view or interact with the created note.

Sharing the note may include sharing all the properties of the note or a portion thereof. For instance, where the link context includes personal user identification information, such information may be removed from the note when sharing the note. In other examples, the user identification information may be transmitted with the note, and the user that receives the note may access the link associated with the note as well as the link context. For example, the document referenced by the link context may be an email to which a first user is the recipient and the second user is the sender. The first user may create the note with the link context. When the first user shares the note with the second user, the second user may also be able to access the link context because the second user is also authorized to access the email. Similar shared authorization for accessing documents or communications may occur with shared documents or communications that are being edited or otherwise shared amongst multiple users. In other situations, the document or communication may be a public or otherwise unrestricted document or communication (e.g., a public post), and the recipient of the shared note is able to access such a document or communication as well.

Figure 9:
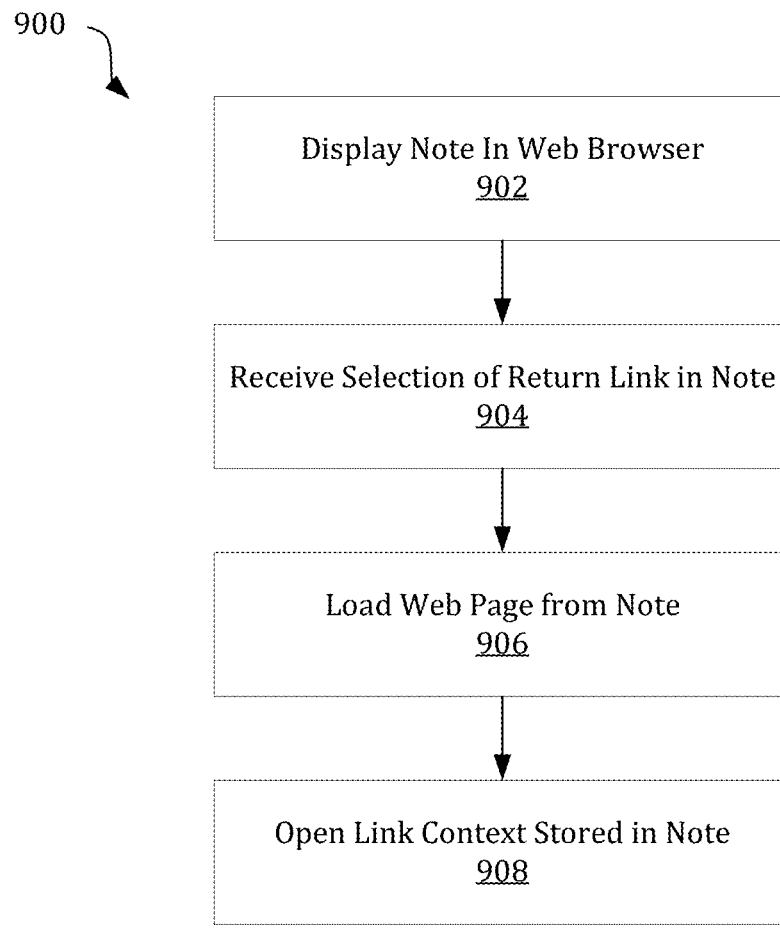
FIG. 9 depicts an example method for accessing a web page from a note.

FIG. 9 depicts an example method 900 for accessing a web page from a note. The operations in method 900 may be performed by a web browser. At operation 902, a note is displayed within the web browser, such as in a sidebar pane of the web browser. The note may be one of the example notes discussed above and include a return link as well as link context. The note may be received from a browser-based notes application.

At operation 904, the web browser receives a selection of the return link in the displayed note. Based on receiving the selection of the return link in the displayed note, the web browser receives at least the web address for the web page corresponding to the note and the link context for the web page. The link context may indicate the document containing the link from which the web page was first accessed, as discussed above. The web address and the link context may be received from the browser-based notes application.

At operation 906, the web browser loads the web page according to the web address received in response to the selection of the return link. The web page may be loaded in a primary display area of the web browser. At operation 908, the web browser also opens the link context that is stored in the note and received based on the selection of the return link from the note. Opening the link context may include identifying the browser-based application identified in the link context and sending the communication or document identifier to the identified browser-based application. The browser-based application then sends at least a portion of the document back to the browser for display. The web browser then displays the document (or portion thereof) that is received from the browser-based application. The document may be displayed within a sidebar pane of the web browser and/or concurrently with the web page loaded in operation 906.

Figure 10:
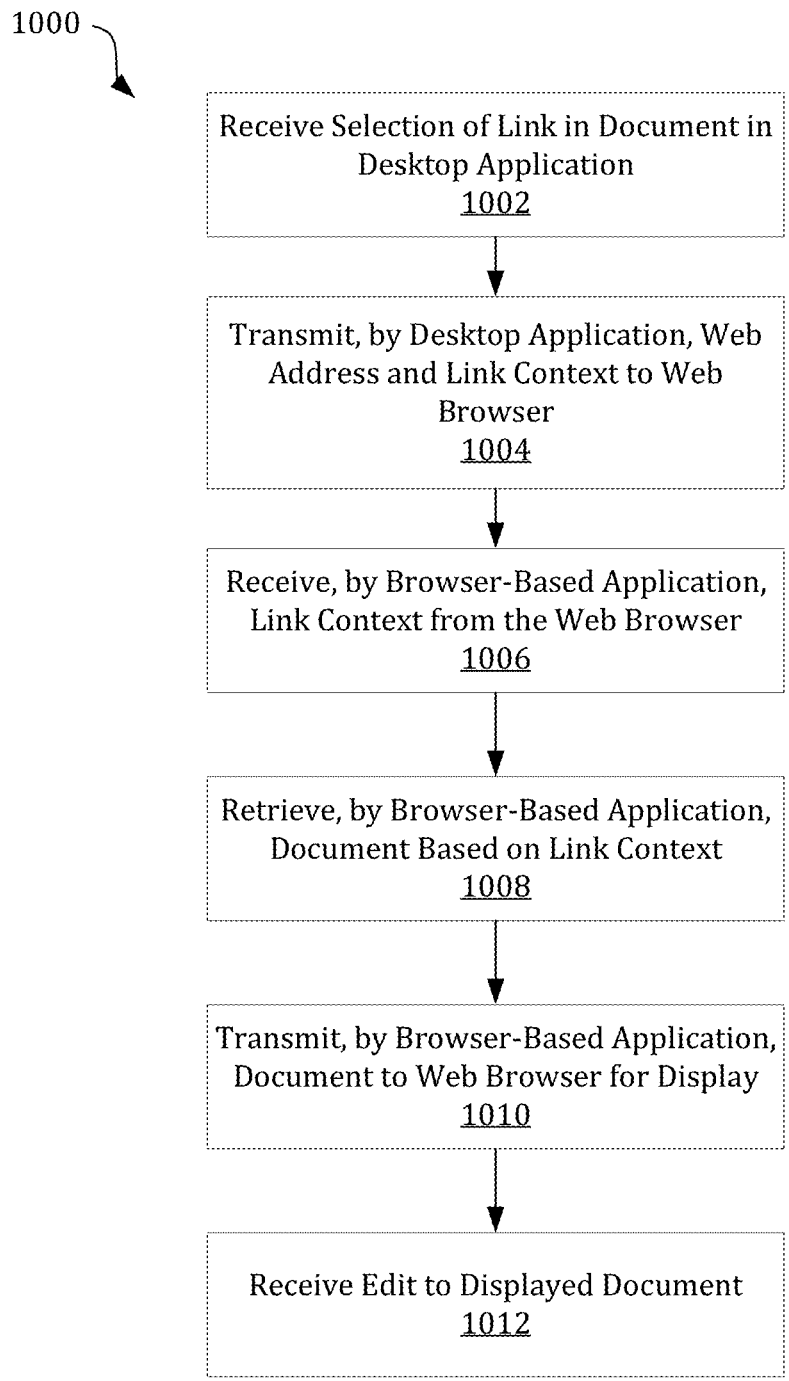
FIG. 10 depicts an example method for preserving link context across desktop and browser-based applications.

FIG. 10 depicts an example method 1000 for preserving link context across desktop and browser-based applications. The operations of the method 1000 may be performed by a desktop application and a corresponding browser-based application. At operation 1002, a selection of a link in a document or communication is received by a desktop application. For example, the desktop application may be an email application at the document may be an email. The email contains a link to a web page. At operation 1004, based on receiving the selection of the link, the desktop application transmits the web address for the selected link and additional link context to a web browser. The link context may include the properties and/or data items discussed above, such as a communication or document identifier and an identification of the desktop application. The web browser then passes the received link context to a browser-based application corresponding to the desktop application.

At operation 1006, the corresponding browser-based application receives the link context from the web browser. At operation 1008, based on the received link context, the browser-based application retrieves the document or communication from the which the link was selected in operation 1002. For instance, based on the document identifier received in the link context, the browser-based application queries a database of documents to identify the corresponding document and retrieves that document. At operation 1010, the browser-based application then transmits at least a portion of the retrieved communication or document to the web browser for display within the web browser.

In some examples, the user may also be able to interact with the document displayed in the web browser, such as when the document is displayed in the sidebar pane. As an example, at operation 1012, the browser-based application may receive an edit to the displayed document via input into the web browser. For instance, an edit to the document may be received while displayed in the sidebar pane via user input into the web browser. In other examples, a selection of the displayed document may cause the document to be opened in the desktop application and/or in another tab or window of the web browser for a richer viewing or editing experience.

Figure 11:
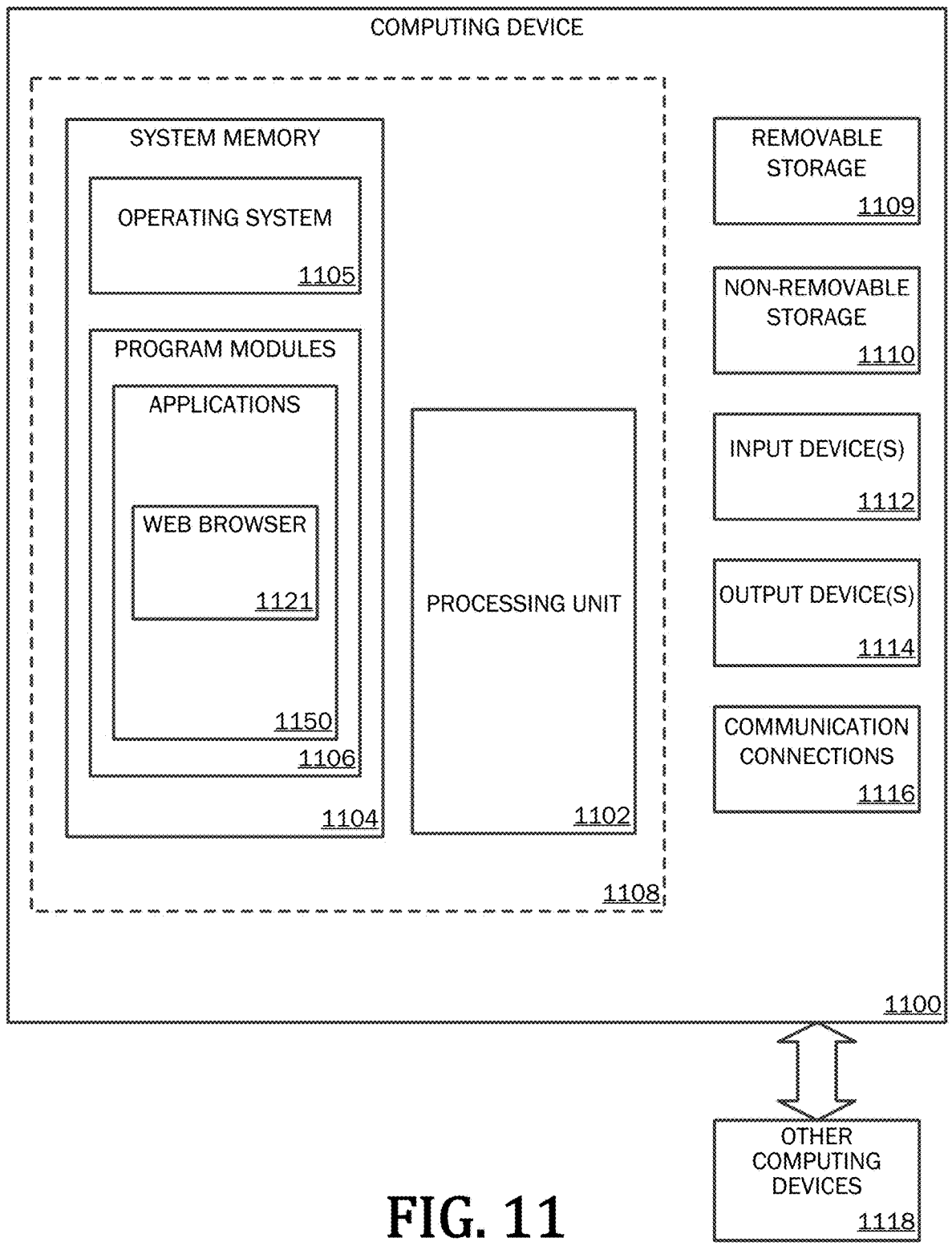
FIG. 11 is a block diagram illustrating example physical components of a computing device with which aspects of the technology may be practiced.

FIGS. 11-12 and the associated descriptions provide a discussion of a variety of operating environments in which examples of the invention may be practiced. However, the devices and systems illustrated and discussed with respect to FIGS. 11-12 are for purposes of example and illustration and are not limiting of a vast number of computing device configurations that may be utilized for practicing aspects of the invention, described herein.

FIG. 12 is a block diagram illustrating physical components (i.e., hardware) of a computing device 1100 with which examples of the present disclosure may be practiced. The computing device components described below may be suitable for a client device running the web browser discussed above. In a basic configuration, the computing device 1100 may include at least one processing unit 1102 and a system memory 1104. The processing unit(s) (e.g., processors) may be referred to as a processing system. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1150 such as a web browser 1121.

The operating system 1105, for example, may be suitable for controlling the operation of the computing device 1100. Furthermore, aspects of the invention may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 may perform processes including, but not limited to, one or more of the operations of the methods illustrated in FIGS. 7-10. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 1100 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
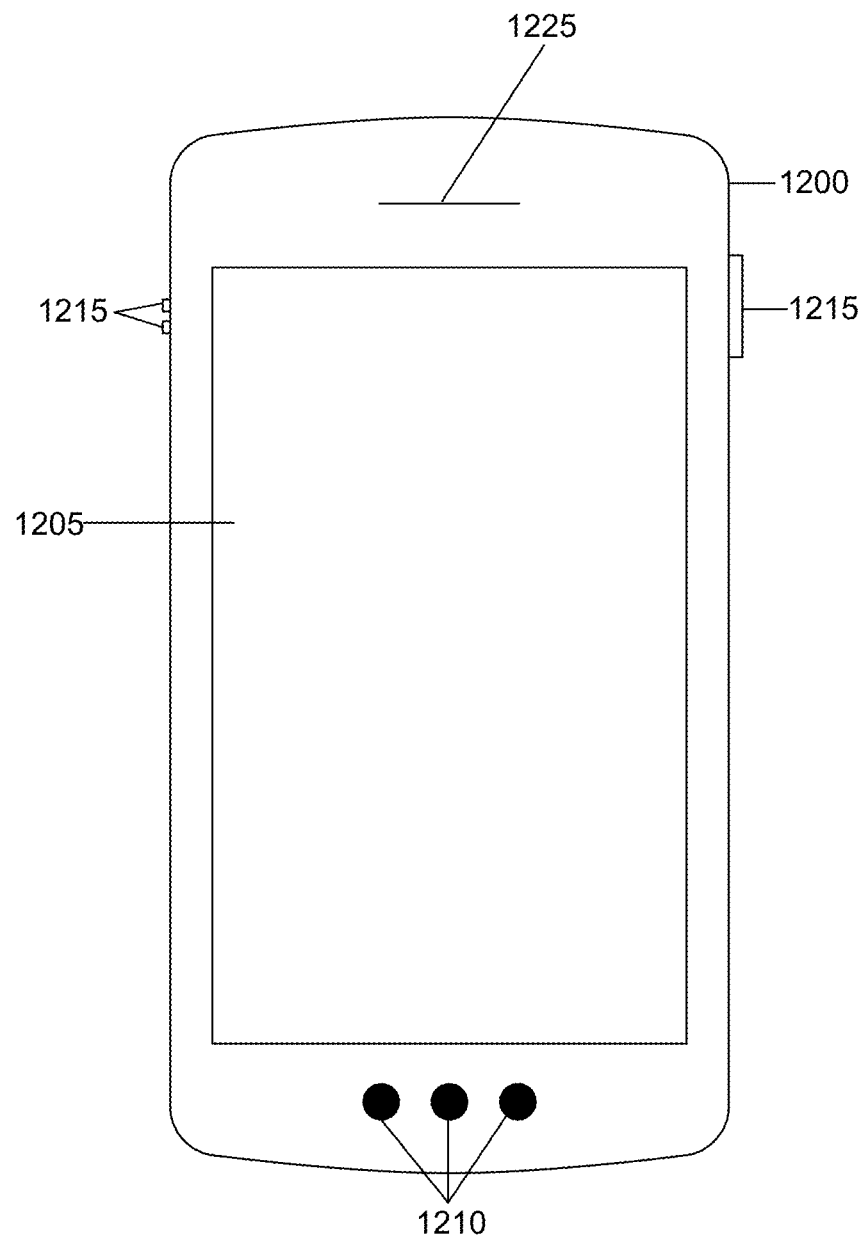
FIGS. 12A and 12B are simplified block diagrams of a mobile computing device with which aspects of the present technology may be practiced.
Figure 12B:
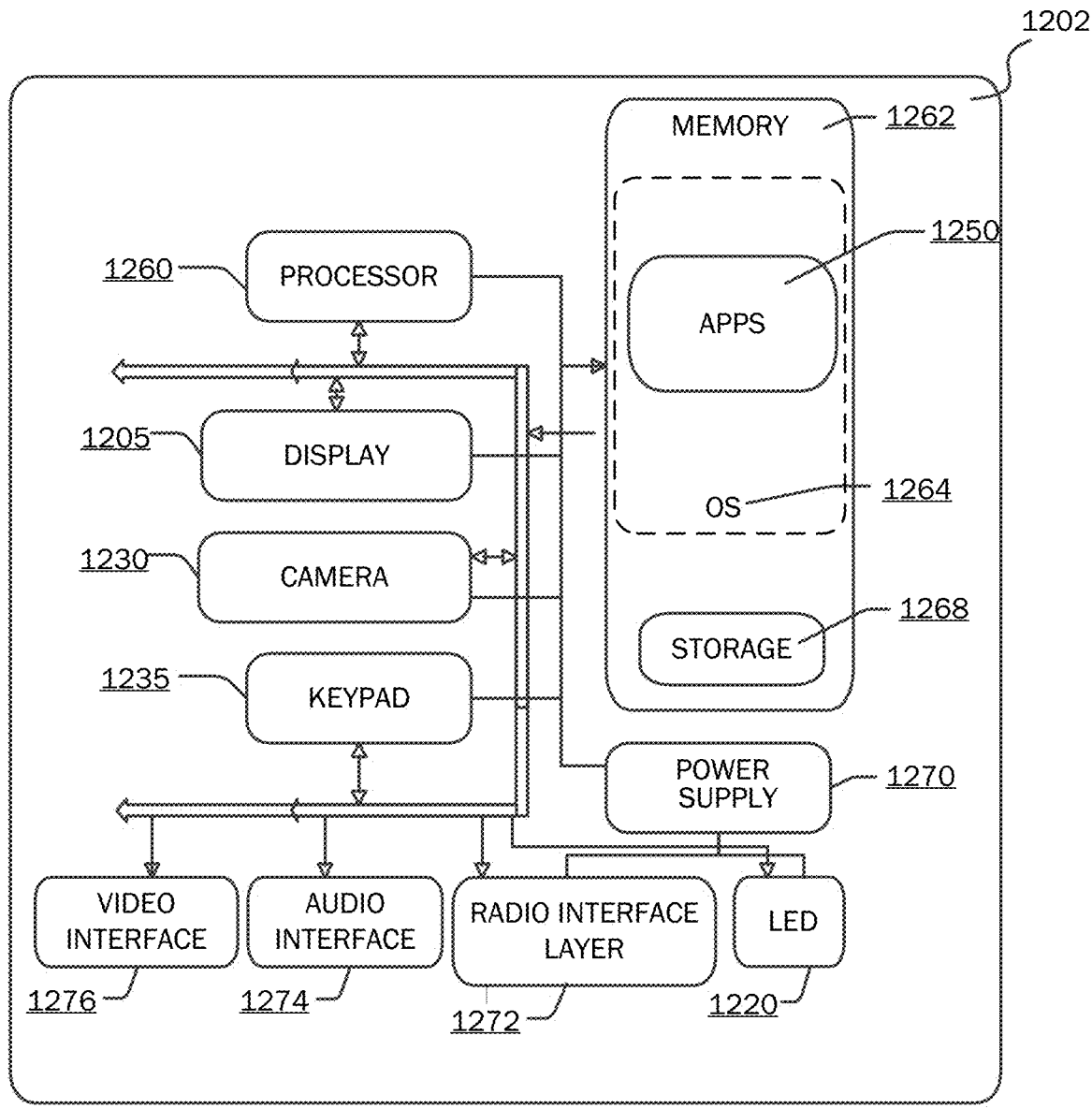

FIGS. 12A and 12B illustrate a mobile computing device 1200, for example, a mobile telephone, a smart phone, a tablet personal computer, a laptop computer, and the like, with which aspects of the invention may be practiced. With reference to FIG. 12A, an example of a mobile computing device 1200 for implementing at least some aspects of the present technology is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative examples, mobile computing device 1200 may incorporate more or less input elements. For example, the display 1205 may not be a touch screen in some examples. In alternative examples, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various aspects, the output elements include the display 1205 for showing a graphical user interface (GUI), a visual indicator 1220 (e.g., a light emitting diode), and/or an audio transducer 1225 (e.g., a speaker). In some examples, the mobile computing device 1200 incorporates a vibration transducer for providing the user with tactile feedback. In yet another example, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one example of a mobile computing device. That is, the mobile computing device 1200 can incorporate a system (i.e., an architecture) 1202 to implement some examples. In one example, the system 1202 is implemented as a "smart phone" capable of running one or more applications (e.g., videoconference or virtual meeting application, browser, e-mail, calendaring, contact managers, messaging clients, games, and media clients/players). In some examples, the system 1202 is integrated as a computing device, such as an integrated personal digital assistant (PDA) and wireless phone.

One or more application programs 1250 may be loaded into the memory 1262 and run on or in association with the operating system 1264. Examples of the application programs include videoconference or virtual meeting programs, phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1250 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at a remote device or server. As should be appreciated, other applications may be loaded into the memory 1262 and run on the mobile computing device 1200.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1250 via the operating system 1264, and vice versa.

The visual indicator 1220 may be used to provide visual notifications and/or an audio interface 1274 may be used for producing audible notifications via the audio transducer 1225. In the illustrated example, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

As should be appreciated from the foregoing, in one aspect, the present technology relates to a system for displaying link context in a web browser. The system may also include memory storing instructions that, when executed by the processing system, cause the system to perform operations. The operations include: receiving, by a web browser, a web address from an application based on a selection of a link in document displayed in the application; receiving, by the web browser from the application, link context for the selected link, the link context including an identification of the application and an identification of the document; loading a web page corresponding to the received web address; based on the link context, identifying a browser-based application corresponding to the application; launching the browser-based application within the web browser; transmitting the link context to the browser-based application; and displaying at least a portion of the document within the web browser.

Implementations may include one or more of the following features. The system where the link context further includes an identification of a user accessing the application. The system where the document is displayed concurrently with the web page. The system where the document is displayed in a sidebar pane of the web browser and the web page is displayed in a primary display area of the web browser. The system where the document is one of an email or a word-processing document. The system where the application is a desktop application. The system where the desktop application is an email application.

In another aspect, the technology relates to a method for displaying link context in a web browser. The method may include receiving, by a web browser, a web address from a desktop application based on a selection of a link in document displayed in the desktop application. The computer-implemented method may also include receiving, by the web browser from the application, link context for the selected link, the link context including an identification of the desktop application and an identification of the document. The method may furthermore include loading a web page corresponding to the received web address. The method may in addition include based on the link context, identifying a browser-based application corresponding to the desktop application. The method may moreover include launching the browser-based application within the web browser. The method may also include transmitting the link context to the browser-based application. The method may furthermore include displaying at least a portion of the document within the web browser.

Implementations may include one or more of the following features. The method where the link context further includes an identification of a user accessing the desktop application. The method where the document is displayed concurrently with the web page. The method where the document is displayed in a sidebar pane of the web browser and the web page is displayed in a primary display area of the web browser. The method where the document is one of an email or a word-processing document. The method where the desktop application is an email application. The method where launching the browser-based application includes displaying the browser-based application in a sidebar pane of the web browser.

In another aspect, the computer-implemented method for displaying link context in a web browser. The method may include receiving, by a desktop application, a selection of a link in a document displayed in the desktop application. The computer-implemented method may also include based on receiving the selection of the link, transmitting a web address of the link and a link context to a web browser, the link context including an identification of the desktop application and an identification of the document. The method may furthermore include receiving from the web browser, by a browser-based application corresponding to the desktop application, the link context. The method may in addition include retrieving the document based on the identification of the document in the link context. The method may moreover include transmitting the document to the web browser for display in the web browser.

Implementations may include one or more of the following features. The method where the document is an email and the desktop application is an email application. The method where the document is a word-processing document and the desktop application is a word-processing application. The method where the link context further includes an identification of a user accessing the desktop application. The method where retrieving the document is further based on the identification of the user. The method may include: receiving, by the browser-based application, an edit to the displayed document via input into the web browser; and storing the edit to the document.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A system for displaying link context in a web browser, the system comprising:
   a processing system; and
   memory storing instructions that, when executed by the processing system, cause the system to perform operations comprising:
   receiving, by a web browser, a web address from an application based on a selection of a link in a document displayed in the application;
   receiving, by the web browser from the application, link context for the selected link, the link context including an identification of the application and an identification of the document;
   loading a web page corresponding to the received web address;
   based on the link context, identifying a browser-based application corresponding to the application;
   launching the browser-based application within the web browser;
   transmitting the link context to the browser-based application; and
   displaying at least a portion of the document within the web browser.

2. The system of claim 1, wherein the link context further includes an identification of a user accessing the application.

3. The system of claim 1, wherein the document is displayed concurrently with the web page.

4. The system of claim 3, wherein the document is displayed in a sidebar pane of the web browser and the web page is displayed in a primary display area of the web browser.

5. The system of claim 1, wherein the document is one of an email or a word-processing document.

6. The system of claim 1, wherein the application is a desktop application.

7. The system of claim 6, wherein the desktop application is an email application.

8. A computer-implemented method for displaying link context in a web browser, the method comprising:
   receiving, by a web browser, a web address from a desktop application based on a selection of a link in a document displayed in the desktop application;
   receiving, by the web browser from the application, link context for the selected link, the link context including an identification of the desktop application and an identification of the document;
   loading a web page corresponding to the received web address;
   based on the link context, identifying a browser-based application corresponding to the desktop application;
   launching the browser-based application within the web browser;
   transmitting the link context to the browser-based application; and
   displaying at least a portion of the document within the web browser.

9. The method of claim 8, wherein the link context further includes an identification of a user accessing the desktop application.

10. The method of claim 8, wherein the document is displayed concurrently with the web page.

11. The method of claim 10, wherein the document is displayed in a sidebar pane of the web browser and the web page is displayed in a primary display area of the web browser.

12. The method of claim 8, wherein the document is one of an email or a word-processing document.

13. The method of claim 8, wherein the desktop application is an email application.

14. The method of claim 8, wherein launching the browser-based application includes displaying the browser-based application in a sidebar pane of the web browser.

15. A computer-implemented method for displaying link context in a web browser, the method comprising:
   receiving, by a desktop application, a selection of a link in a document displayed in the desktop application;
   based on receiving the selection of the link, transmitting a web address of the link and a link context to a web browser, the link context including an identification of the desktop application and an identification of the document;
   receiving from the web browser, by a browser-based application corresponding to the desktop application, the link context;
   retrieving the document based on the identification of the document in the link context; and
   transmitting the document to the web browser for display in the web browser.

16. The method of claim 15, wherein the document is an email and the desktop application is an email application.

17. The method of claim 15, wherein the document is a word-processing document and the desktop application is a word-processing application.

18. The method of claim 15, wherein the link context further includes an identification of a user accessing the desktop application.

19. The method of claim 18, wherein retrieving the document is further based on the identification of the user.

20. The method of claim 15, further comprising:
receiving, by the browser-based application, an edit to the displayed document via input into the web browser; and
storing the edit to the document.

\* \* \* \* \*